Patented July 15, 1941

2,249,112

UNITED STATES PATENT OFFICE 2,249,112

HYDROGENATION OF TERPENE POLYMERS

Marie O. Carmody, Mount Lebanon, Pa.

No Drawing. Application December 24, 1937,
Serial No. 181,603

11 Claims. (Cl. 260—666)

This invention relates to the hydrogenation of terpene polymers, more particularly to hydrogenated terpene polymers as new articles of commerce and the method of producing the same.

The art of hydrogenating is, of course, an old and well known one. Many oils, for example, have been heretofore hydrogenated with resultant beneficial changes in characteristics. Hydrogenation has in particular been carried out in connection with vegetable oils, thus producing valuable shortenings and similar products.

The polymerization of oils and the like is also an old and well-known art, being particularly well known, for example, in connection with the production of synthetic resins of various types, such as those generically designated as phenolic condensation products.

Insofar as is known, however, hydrogenation has never been carried out in connection with terpene polymers and hence this particular subject seems to have been overlooked by prior investigators. Hydrogenated terpene polymers in accordance with the present invention are thus entirely new products.

It is, accordingly, one of the objects of the present invention to hydrogenate polymers, particularly those derived from terpenes of which turpentine and pinene are well known examples.

It is another object of the present invention to produce hydrogenated terpene polymers having new and valuable characteristics and properties and which, for example, may consist of hydrogenated resins distinctive from the unhydrogenated resins from which they are produced.

A procedure for producing hydrogenated terpene polymers in a simple and inexpensive manner forms another object of this invention.

The conversion to hydrogenated and saturated form of terpene polymers of all degrees of polymerization to produce new and useful products forms still another object of this invention.

Other and further objects and advantages will be understood by those skilled in this art or will be apparent or pointed out hereinafter.

The terpenes in general and turpentine and pinene in particular are well known for their reactivity. The ability of these compounds to polymerize in the presence of appropriate catalysts is well known and a particular mode of polymerization has been set forth in an application filed by William H. Carmody under Serial No. 139,739, filed April 29, 1937.

In that application polymerization of terpenes is effected by means including the use of a catalyst therein termed Attapulgus clay. It is, however, also known that terpenes can be polymerized by other catalysts such as aluminum chloride, zinc chloride, tin tetrachloride, sulphuric acid, etc. The products produced by these catalytic agents range from the isomer and dimer to the octamer and resins, although it has been found that the greater bulk of the polymers has an average molecular weight corresponding more nearly to the tetramer. A study of these polymers leads to the conclusion that regardless of their method of preparation they are chemically alike in that they are linear polymers with a varying number of units in a row depending upon the extent of polymerization.

Terpenes are chemically designated by the formula $C_{10}H_{16}$ and are characterized by the fact that they contain double bonds, i. e., terpenes are unsaturated compounds. All terpene polymers may be empirically designated by the formula $(C_{10}H_{16})_n$, where $n$=the number of units in the polymeric row. Certain polymers are characterized further by the fact that each unit above referred to contains an inner cyclo-butane ring and only one of the units has an unsaturated double bond, the remaining units being saturated.

These cyclo-butane rings and double bonds can in accordance with the present invention be opened and hydrogenated when subjected to active hydrogenating conditions and when fully hydrogenated each molecule is saturated. When a terpene resin, for example, has been caused to take up as much hydrogen as it is capable of combining with it would have the empirical formula $$(C_{10}H_{18})_{n-1} + C_{10}H_{20}$$

Such a state of total hydrogenation relieves the strains occurring in each original terpene unit without fundamentally changing the open chain construction of the polymers and hence the hydrogenated polymers appear in the finished state as clear colorless resinous or resin-like materials.

Hydrogenated terpene resins according to the present invention are characterized by properties distinctly different from the corresponding properties of the unhydrogenated compounds. For illustrative purposes a number of comparative properties are set forth in the following table:

Table I

| Property | Unhydrogenated | Hydrogenated |
|---|---|---|
| Color | Pale yellow | Colorless. |
| Odor when heated | Sharp like sealing wax. | Mild and sweet. |
| Taste | Noticeable | None. |
| Molecular weight | About 500 | Slightly above 500. |
| Saturation | One double bond | Totally saturated. |
| Heat stability | Turns slowly red | No appreciable change. |
| Specific gravity | Slightly over 1 | Distinctly less than 1. |
| Acidity | Vapors redden litmus. | Neutral. |
| Melting point | About 95° C | About 95° C. |
| Solubility in alcohol | Insoluble | Insoluble. |
| Solubility in hydrocarbons. | Soluble | Soluble. |

From the above table it will be observed that hydrogenated terpene resins have a number of properties and characteristics distinct from those of the unhydrogenated compounds and this is true proportionately for all hydrogenated terpene polymers which we have investigated, it being understood that the term "hydrogenated terpene polymers" includes terpene isomers, dimers, etc., up to octamers and resins which have been hydrogenated as fully as their structures permit until they are all in a saturated condition, chemically speaking.

The hydrogenated terpene dimer also differs from the unhydrogenated dimer being characterized by having its aniline point elevated to 50° C. and thus having decreased solvent power, by being absolutely water white and free from odor at room temperature. It is stable to heat and only very slightly darkens during distillation, the range of which is as follows:

1st drop at 318° C.
10%----------------------------------324
20%----------------------------------326
30%----------------------------------327
50%----------------------------------331
60%----------------------------------332
70%----------------------------------337
92%----------------------------------339
Specific gravity 0.936 at 20° C.

The procedure for producing hydrogenated terpene polymers as above described is simply and inexpensively accomplished as has been amply demonstrated and confirmed by actual experiments.

For example, in one instance I took 200 grams of terpene resin made by the aluminum chloride process, 200 cc of solvent and 50 grams of a special catalyst, hereinafter termed Raney catalyst. These ingredients were placed in a bomb, charged with hydrogen and heated, and the course of reaction was followed by noting the decrease in gas pressure of the hydrogen as it was absorbed into and combined with the resin molecules. The changes occurring during reaction can be expressed by the following table:

*Table II*

| No. | Time | Hours | Temp. | Press. |
|---|---|---|---|---|
| 1 | 7:00 | 0–0 | 17 | 900 |
| 2 | 7:10 | 0–10 | 68 | 1020 |
| 3 | 7:30 | 0–30 | 152 | 600 |
| 4 | 7:45 | 0–45 | 154 | 320 |
| 5 | 8:00 | 1–0 | 158 | 310 |

BOMB COOLED AND RECHARGED TO 900 LBS. PRESSURE

| | | | | |
|---|---|---|---|---|
| 6 | 8:45 | 1–45 | 30 | 900 |
| 7 | 9:00 | 2–0 | 89 | 960 |
| 8 | 9:30 | 2–30 | 164 | 470 |

BOMB COOLED AND RECHARGED TO 900 LBS. PRESSURE

| | | | | |
|---|---|---|---|---|
| 9 | 10:30 | 3–30 | 31 | 920 |
| 10 | 11:00 | 4–0 | 108 | 870 |
| 11 | 11:30 | 4–30 | 159 | 990 |

From this table it can be calculated that approximately 2.05 mols of hydrogen were used for the 200 grams of resin. From melting point determinations of the resin it can be stated that the molecular weight is close to 500. It can, therefore, be estimated that in this particular experiment the reaction ran to about 91 per cent completion.

In connection with the foregoing experiment the solvent consisted of petroleum benzine, this being a highly refined petroleum cut whose boiling range covers 90–130 degrees C. with at least 75 per cent boiling between 110–115 degrees C. The specific gravity of this solvent is about 0.72–0.74.

The Raney catalyst referred to above is a special nickel catalyst which is prepared by a special procedure. To produce this nickel catalyst a fused alloy composed of 50 per cent nickel and 50 per cent aluminum is solidified, crushed and ground to approximately 250–300 mesh in which condition it is a dull gray powder having the general appearance of ground slate. It is from this powder that the catalyst is prepared for use, as needed.

To produce 50 grams of finished catalyst 100 grams of the powdered alloy is weighed out. 100 grams of commercial sodium hydroxide is separately weighed out and dissolved in water to produce a 15–20 per cent solution which is usually warm when prepared. Into this caustic solution the finely ground nickel-aluminum alloy is sprinkled, a small amount at a time. A vigorous reaction takes place upon each addition of alloy which continues until all the metallic aluminum has been converted to sodium aluminate which is soluble in water. The metallic nickel is not affected by the caustic and is left as a very finely divided nickel sponge resulting from the dissolving out of the aluminum and thus leaving an immense number of capillaries or tiny passages penetrating into each particle of nickel. When all the alloy has been added to the caustic solution and when reaction has ceased, the products are allowed to settle, the nickel descending to the bottom and the solution being then decanted. Water is added a number of times under agitation and the nickel is allowed to settle out an equal number of times and the supernatant liquors decanted until all traces of sodium hydroxide are removed which ordinarily requires six to eight such washings to reach neutrality.

When, as in connection with the present invention, the nickel catalyst is to be used in connection with hydrocarbon solutions which are immiscible with water, the nickel catalyst must be freed from its original water content and transferred to a hydrocarbon identical with the one in which the resin is dissolved. This drying, removal of water and transferrence to oil is carried by distilling the catalyst slurry with the solvent in question, in this case in the presence of petroleum benzine. During distillation the petroleum benzine and the water vapor are simultaneously removed and condensed together. The condensed petroleum benzine is separated from the condensed water and the former put back into the still to assist in further water removal. When all water is removed the catalyst appears as a dense black spongy nickel powder covered with petroleum benzine and it is necessary to protect the catalyst from the air at all times which not only oxidizes it but which lowers its activity, making it inoperative at low temperatures.

Other experiments have confirmed and corroborated the foregoing and to the best of my knowledge hydrogenated terpene polymers have not heretofore been produced by any procedure.

In further explanation of the chemical structural changes effected by and involved in the present invention it will be helpful to consider the following example which is not to be construed as a restriction on the invention.

Pinene (monomer) may be designated by the structural formula:

I.
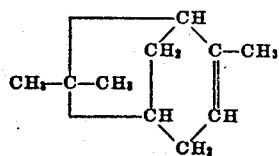

When two pinene monomer molecules polymerize to form pinene dimer, this may be designated structurally by the formula:

II.
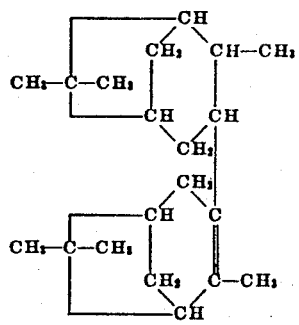

When II is hydrogenated by the addition of two hydrogen atoms the hydrogen enters the unsaturated dimer at the double bond to produce the following saturated dimer without a double bond:

III.
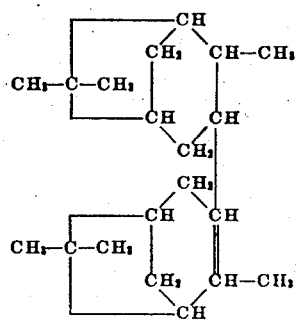

Pinene dimer III still contains 2 cyclo-butane rings and upon further deep-seated hydrogenation these rings are ruptured to produce an isopropyl group attached to a methyl cyclo-hexane ring believed to be as follows:

IV.
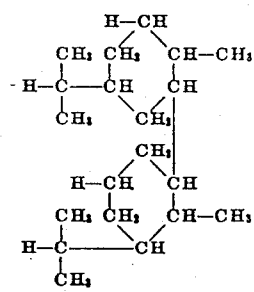

In IV there are no double bonds and no cyclobutane rings. The dimer is fully hydrogenated and saturated.

Hydrogenated pinene polymers as herein produced have varied and important uses. They may be used in varnishes particularly where initial paleness of color and color stability are desired. Their solubility-viscosity characteristics make them useful as impregnants, adhesive material and as a vehicle for metallic paints, the leafing characteristics of aluminum flake being specifically enhanced. They are compatible with many mineral oils and can be blended with rubber to produce soft tacky compositions. These examples could be multiplied as will be understood by those skilled in this field.

The foregoing is presented as illustrative and exemplary, the invention being rather defined by the appended claims. While I believe that polymerization and hydrogenation proceeds in accordance with the above I do not intend to be limited in such respects. Such modifications as fall within the scope of the claims are deemed to be a part of this invention.

Having thus described my invention, what I claim as new and desire to secure by Letters Patent is:

1. A hydrogenated and saturated terpene polymer having a plurality of modified terpene molecules linearly arranged and structurally interconnected and wherein each of the original terpene molecules has had its cyclo-butane ring converted to an isopropyl group attached to a methyl cyclo-hexane ring.

2. As a new article of commerce a hydrogenated terpene dimer having the formula:

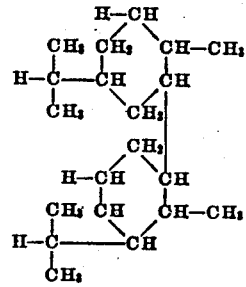

3. As a new article of commerce, a terpene polymer having its double bond saturated with hydrogen and at least one of its inner rings opened and saturated with hydrogen.

4. As a new article of commerce, hydrogenated terpene resin characterized by having its terminal double bond saturated with hydrogen and at least one of its cyclo-butane rings opened and saturated with hydrogen.

5. As a new article of commerce, a hydrogenated terpene polymer in which the double bond of the terminal unit is saturated with hydrogen and a plurality of its cyclo-butane rings have been opened and saturated with hydrogen.

6. As a new article of commerce, a hydrogenated terpene polymer in which the double bond of the terminal unit is saturated with one mole of hydrogen and all its cyclo-butane rings have been opened and each such ring saturated with one mole of hydrogen.

7. As a new article of commerce, a hydrogenated terpene polymer containing at least two moles of added hydrogen, at least one such mole serving to saturate an opened cyclo-butane ring in one of the terpene units of the polymer.

8. As a new article of commerce, a hydrogenated terpene polymer having a formula ranging from $(C_{10}H_{20})-(C_{10}H_{16})$ to $(C_{10}H_{20})-(C_{10}H_{18})_n$, inclusive, in which $n$=the number of terpenic units in the polymer, at least one of said terpenic units having its inner cyclo-butane ring opened and saturated with added hydrogen.

9. A method of producing a hydrogenated terpene polymer which contains at least two linearly arranged and structurally interconnected terpene units, each of which has an inner cyclobutane ring, and at least two moles of added hydrogen at least one of which saturates an opened cyclo-butane ring comprising the steps of bringing a solution of a terpene polymer into contact with hydrogen in the presence of Raney catalyst in such amounts and under such conditions of temperature and pressure as to saturate with hydrogen the double bond inherent in the structure of such polymer and to open at least one cyclo-butane ring and saturate it with hydrogen.

10. A method of producing a hydrogenated terpene polymer which contains at least two linearly arranged and structurally interconnected terpene units, each of which has an inner cyclo-butane ring, and at least two moles of added hydrogen at least one of which saturates an opened cyclo-butane ring comprising the steps of reacting a terpene polymer in solution in the presence of Raney catalyst with enough hydrogen to saturate the single double bond characteristic of all terpene polymers and at least one cyclo-butane ring, the hydrogenating conditions being such as to cause opening of at least one such cyclo-butane ring.

11. A method of producing a hydrogenated terpene polymer which contains at least two linearly arranged and structurally interconnected terpene units, each of which has an inner cyclo-butane ring, and at least two moles of added hydrogen at least one of which saturates an opened cyclo-butane ring comprising the steps of subjecting a terpene polymer in solution to the action of hydrogen in the presence of a catalyst such as Raney nickel which has the capacity of opening at least one cyclo-butane ring in the polymer and saturating the polymer thereat with hydrogen as well as causing saturation of the double bond characteristic of such polymer with hydrogen.

MARIE O. CARMODY.

CERTIFICATE OF CORRECTION.

Patent No. 2,249,112.                                                    July 15, 1941.

MARIE O. CARMODY.

It is hereby certified that error appears in the printed specification of the above numbered patent requiring correction as follows: Page 3, first column, lines 30 to 45, Formula III, strike out the double bond in the lower right-hand portion of the formula and insert instead a single bond; and that the said Letters Patent should be read with this correction therein that the same may conform to the record of the case in the Patent Office.

Signed and sealed this 26th day of August, A. D. 1941.

(Seal)

Henry Van Arsdale,
Acting Commissioner of Patents.